Patented Mar. 9, 1948

UNITED STATES PATENT OFFICE 2,437,600

SYNTHESIS OF ALDEHYDES

William F. Gresham, Richard E. Brooks, and Walter M. Bruner, Wilmington, Del., assignors to E. I. du Pont de Nemours & Company, Wilmington, Del., a corporation of Delaware No Drawing. Application June 7, 1945, Serial No. 598,208

11 Claims. (Cl. 260—604)

This invention relates to the synthesis of organic oxygen-containing compounds and, in particular, to the synthesis of saturated and unsaturated aldehydes by reaction between organic unsaturated compounds containing olefinic unsaturation, carbon monoxide, and hydrogen.

It was early observed by Patart (French Patent 593,648) that when a mixture containing ethylene, carbon monoxide, and hydrogen was heated under a pressure of 150 to 250 atmospheres at a temperature of 300° C. in the presence of a zinc chromate catalyst, a reaction product was obtained which consisted essentially of methanol and hydrocarbons, but which also contained very small quantities of aldehydes and higher alcohols. In 1930, it was reported by Smith, Hawk, and Golden (J. A. C. S., 52, 3221) that oxygen-containing compounds other than methanol were formed in 25% to 35% yield when mixtures of ethylene, carbon monoxide, and hydrogen were heated at temperatures of about 206° to 245° C., under atmospheric pressure in the presence of a cobalt-copper-manganese oxide catalyst. The nature of these oxygen-containing compounds was not ascertained, although aldehydes boiling below 100° C. were shown to be present. Later it was reported (German Patents 539,990 and 660,619) that mixtures of hydrogen and carbon monoxide react with ethylene at high temperature (500° C.) under increased pressures (150 atmospheres) to give a mixture of hydrocarbons, higher alcohols, and ketones. More recently, an important advance was made by O. Roelen (U. S. Patent 2,327,066) who found that yields of propionaldehyde considerably higher than had been obtained theretofore (in one instance, the amount of propionaldehyde reported by Roelen was 40% of the total weight of liquid product), and, in addition, other oxygen-containing products, could be obtained by processing mixtures of ethylene, carbon monoxide, and hydrogen at a temperature of about 40° to 200° C. under a pressure within the range of about 20 to 300 atmospheres in the presence of hydrogenation catalysts.

An object of this invention is to provide an improved process for the synthesis of saturated and unsaturated aldehydes from organic unsaturated compounds containing olefinic unsaturation, carbon monoxide, and hydrogen. Another object is to control the reaction between olefinic compounds, carbon monoxide and hydrogen so as to obtain aldehydes almost exclusively, rather than the mixture of ketones, aldehydes, etc., obtained according to the prior art. Other objects will appear hereinafter.

This invention involves the surprising discovery that at pressures in excess of 300 atmospheres, the formation of ketones from compounds containing olefinic unsaturation, carbon monoxide and hydrogen, in the presence of hydrogenation catalysts is completely or almost completely avoided, and aldehydes are formed in very high yields. More particularly, it has been discovered in accordance with the invention that the reaction between olefinic compounds, carbon monoxide, and hydrogen produces aldehydes in yields as high as 70% to 100% at pressures in excess of 300 atmospheres, preferably within the range of about 325 to 1500 atmospheres, at a temperature of about 75° to 250° C. preferably 100° to 200° C., in the presence of certain catalysts to be hereinafter disclosed.

In one of its important aspects the invention may be viewed as a novel method for controlling competing reactions in the olefine-$H_2$-CO system, so that the desired aldehydic products are obtained selectively. Thus, in a specific embodiment, the present invention involves two competing reactions, e. g., (1) $CH_2{=}CH_2 + CO + H_2 \rightarrow CH_3CH_2CHO$ (2) $2CH_2{=}CH_2 + CO + H_2 \rightarrow CH_3CH_2\underset{\underset{O}{\|}}{C}CH_2CH_3$ According to the prior art these two reactions (and others) occur simultaneously at pressures up to 300 atmospheres. The normal effect of increased pressure would be to suppress Reaction 1 and to favor Reaction 2 since the former is accompanied by the smaller volume decrease.

The following table, based on experimental data obtained by procedures described more fully in the examples which follow, shows the effect of pressure on these competing reactions. Briefly, the experiments were made by heating mixtures containing 75 cc. diethyl ether, 28 grams of ethylene and 10 grams of metallic cobalt catalyst in a shaker tube in the presence of a gas containing two volumes of hydrogen per volume of carbon monoxide. Temperatures were held within the range of 120° to 160° C. The reaction was exothermic, and a heat-removing means was required, especially at the higher pressures. The table shows that at pressures above about 300 atmospheres, propionaldehyde formation was selectively favored.

Reaction between ethylene, hydrogen and carbon monoxide

| Pressure (Atm.) | Reaction Time (min.) | Weight of Propionaldehyde (Monomer and trimer) obtained (grams) | Weight of Other Oxygen-containing Products (Grams) |
|---|---|---|---|
| 200 | 66 | 4.6 | 4.4 |
| 280 | 60 | 4.7 | 10.4 |
| 350 | 71 | 35 | 14.8 |

This advantage is observed not only with ethylene, but with the olefinic compounds generally.

A further advantage of employing increased pressures is realized when the olefinic reactant is propylene, for the reaction at pressures above 300 atmospheres yields a butyraldehyde fraction which contains a much higher ratio of n-butyraldehyde:isobutyraldehyde than the corresponding product obtained at pressures below 300 atmospheres.

The effect of pressure in selectively favoring aldehyde formation is very pronounced when the molar ratio of $CO:H_2$ is initially from about 1:1.5 to about 1:10. These improved results are realized not only with relatively stable olefines such as ethylene, but also with olefinic materials which polymerize rapidly, such as the dienes, although loss by polymerization of the reactant, when the latter type of olefinic materials is used, is sometimes encountered. Such loss may be reduced however by the use of inhibitors like hydroquinone.

The unsaturated compounds containing olefinic unsaturation which may be used in accordance with this invention are the olefinic hydrocarbons and other organic compounds containing a (i. e., at least one) non-benzenoid double bond between carbon atoms. Suitable examples of such compounds are the olefinic hydrocarbons themselves, e. g., ethylene, alkyl-substituted ethylenes (such as propylene, butene-2. isobutylene, pentene-1, tetramethyl ethylene, diisobutylene, and cracked gasoline fractions), cyclohexene, butadiene, isoprene, polymerized dienes, styrene, alpha-methyl styrene, vinyl cyclohexene, pinene, limonene, mixed olefines or olefine fractions obtainable by cracking and/or dehydrogenation of petroleum, cyclohexadiene. dicyclopentadiene: unsaturated oxygenated compounds such as allyl alcohol, allyl acetate, allyl ethers, methallyl alcohol, vinyl acetate, furan, methyl methacrylate, methyl acrylate, methallyl propionate, methyl oleate methyl vinyl ketone, methyl vinyl ether, cyclohexene carboxylic acids, esters of cyclohexene carboxylic acids, (such as methyl $\Delta^3$-tetrahydro benzoate), methallyl methacrylate, acrolein; and, in general, the unsaturated hydrocarbons, esters, ethers, carboxylic acids, amides, aldehydes and ketones containing non-benzenoid olefinic unsaturation.

The olefinic reactants employed in the practice of this invention should preferably be deoxidized prior to use.

The catalysts which may be employed include the hydrogenation catalysts generally, such as nickel, cobalt, iron, copper, ruthenium, and the like and mixtures or compounds thereof. These materials may be used in combination with each other or with inert materials, such as kieselguhr, pumice, etc., or promoters such as $ThO_2$, Mn, etc. The amount of catalyst employed is generally about 0.1 to 10.0% based on the total weight of the reaction mixture.

The reaction is preferably conducted by heating a mixture of carbon monoxide, hydrogen, and organic compound containing olefinic unsaturation in a suitable pressure-resistant vessel in the presence of one of the aforesaid catalysts. Maximum pressure is limited only by the strength of the retaining vessel and may be as high as 3000 atmospheres or even higher. The reaction may be conducted either batchwise or continuously. The relative proportions of reactants employed may be stoichiometrically-required quantities, although other proportions may be employed if desired. Excellent results are obtained when the molal ratio of $CO:H_2$:olefine is in the range of 1:2:1 to about 1:4:1, but such an excess of hydrogen is not indispensable. In one method of practicing the invention the olefinic compound, catalyst, and solvent are placed in a pressure vessel, and a mixture of carbon monoxide and hydrogen is injected under very high pressure. After the reaction is complete, the resulting liquid product is removed from the reaction vessel and the aldehydes are separated therefrom by any suitable method, such as by fractional distillation. In some instances, the product contains the desired aldehydes in polymeric (particularly trimeric) form, and such products may be readily depolymerized during distillation to obtain the monomers.

If desired, any inert liquid may be employed as a reaction medium. Moreover, it has been discovered that in certain cases the yield of product obtained and, in fact, the nature and rate of the reactions occurring are determined at least in part by the nature of the reaction medium, when a medium is employed. Thus, if water is employed, the reaction yields relatively large amounts of unsaturated aldehydes. Examples of suitable solvents for the formation of saturated aldehydes are cyclohexane, xylene, methyl formate, and diethyl ether.

The advantages of the present invention reside not only in the very high yields of aldehydes obtained with such olefines as ethylene, but also in that it permits the preparation of aldehydic products from olefinic reactants which do not give appreciable yields of aldehydes at lower pressures. In many instances, the aldehydes thus obtained can be hydrogenated in situ to the corresponding primary alcohols. Formation of ketones, or products derived therefrom, is virtually completely avoided.

The invention is illustrated further by means of the following examples.

*Example 1.*—The following table shows the effect of pressure, and the proportion of hydrogen in the reaction mixture, on the reaction between carbon monoxide, hydrogen and ethylene. In each experiment the reaction mixture was passed over reduced fused cobalt catalyst at a temperature of 140° to 150° C. (continuous process) and the resulting liquid product was distilled for recovery of the oxygen-containing constituents.

| Charge | Reaction Time (Min.) | (Atmospheres) Pressure | Reacting (Per cent) | Percentage of Monomeric Propionaldehyde in Liquid Product | Percentage of Diethyl Ketone in Liquid Product |
|---|---|---|---|---|---|
| $H_2:CO:C_2H_4$ | 6.8 | 125 | 70 | 50 | 22 |
| $4H_2:CO:C_2H_4$ | 0.5 | 500 | 33.5 | 95.5 | |
| $H_2:CO:C_2H_4$ | 0.5 | 500 | 34 | 92.0 | |
| $2H_2:CO:C_2H_4$ | 0.6 | 700 | 63 | 91 | |

*Example 2.*—A mixture containing 10 grams of reduced fused alkali-free cobalt catalyst, 75 cc. of diethyl ether and 42.1 grams of propylene was heated in a silver-lined shaker tube for 2 hours at a temperature of 108° to 120° C. under a pressure of 470 to 790 atmospheres with $CO:2H_2$. Distillation of the resulting product gave 69.9 grams of n-butyraldehyde which corresponds to a conversion of 97.1%. A portion of the product was in the form of trimer, which depolymerized during the distillation.

Example 3.—A mixture containing 140 grams of ethylene, 140 grams of carbon monoxide and 20 grams of hydrogen was pumped through a silver-lined tube 20 inches long (inside diameter, one inch) at a temperature of 140° C. under a pressure of 700 atmospheres (time one hour). The reaction vessel contained 65 cc. of metallic cobalt catalyst, 8 to 14 mesh, arranged in 3 beds separated by copper rivets. Analysis of resulting products showed that propionaldehyde was produced in 80% conversion, based on the ethylene charged. Rate of production of propionaldehyde was 140 pounds per cubic foot of catalyst per hour.

Example 4.—Example 3 was repeated exactly except that the reaction mixture also contained 900 grams of cyclohexane. The conversion of ethylene to propionaldehyde was 90%. Rate of production of propionaldehyde was 180 pounds per cubic foot of catalyst per hour.

Example 5.—A mixture containing 128 cc. cyclohexane, 28 grams of ethylene and 10 grams of copper molybdate catalyst was heated for 3 hours at 155° to 165° C. under 605 to 810 atmospheres of $CO:2H_2$. The resulting reaction product contained substantially no diethyl ketone, but was chiefly a mixture of propionaldehyde and n-propanol.

Example 6.—A mixture containing 66.1 grams of dicyclopentadiene, 75 cc. of diethyl ether and 10 grams of reduced, fused, cobalt catalyst containing 3% copper was processed in a copper-lined shaker tube with $CO:2H_2$ at 610 to 795 atmospheres for 4.3 hours at a temperature of 110 to 132° C. Distillation of the reaction product gave 22.5 grams of monoaldehyde (B. P. 79° C. at 3 mm.; Carbonyl No., 340, calc., 346), and 27.3 grams of unidentified aldehyde-containing products having a boiling range of from 96° C. at 8 mm. to 158° C. at 7 mm.

The carbonyl number is the number of milligrams of KOH per gram of sample, required to neutralize the acid liberated by reaction between the material tested and hydroxyl amine hydrochloride.

Example 7.—A mixture containing 82.1 grams (1.0 mol) of cyclohexene, 75 cc. of diethyl ether and 10 grams of reduced, fused, cobalt catalyst containing 3% copper was processed in a copper-lined shaker tube for 2 hours, under a pressure of 580 to 790 atmospheres of $CO:4H_2$ at a temperature of 110° to 112° C. Distillation of resulting products gave 41.5 grams of hexahydrobenzaldehyde, B. P. 55° to 60° C. at 19 to 20 mm. (Carbonyl No., 507.5, 508.1; calc., 501), 11.8 grams high-boiling products (103°/7 mm.–194°/5 mm.) and 8.6 grams of a distillation heel which appeared to be about half hexahydrobenzaldehyde trimer.

Example 8.—A mixture containing 58.8 grams (0.716 mol) of cyclohexene, 75 cc. of cyclohexane and 10 grams of a reduced, fused, cobalt catalyst was processed in a copper-lined shaker tube for 2 hours. Sufficient CO and $H_2$ in the mol ratio of 1:4 was injected to maintain the pressure of 183 to 196 atmospheres at the operating temperature of 160° to 170° C. Distillation of the resulting product at atmospheric pressure gave 93.3 grams of a mixture of cyclohexane and unconverted cyclohexene (B. P. 81 to 83° C.) (cyclohexene content, about 41 grams), and 3.9 grams of impure material boiling in the range of 66° C./18 mm. to 81° C./2 mm. (Carbonyl No. of 196). There remained only 0.9 gram of distillation heel. This experiment, when compared with the experiment described in Example 7, shows the poor conversion obtained at relatively low pressure.

Example 9.—A mixture containing 43 grams of methyl acrylate, 0.5 gram of hydroquinone, 100 cc. of methyl formate and 10 grams of reduced, fused cobalt catalyst was processed in a shaker tube with $CO:2H_2$ under 390 to 730 atmospheres pressure at 145° to 167° C. for one hour. Distillation of the resulting product gave methyl 4-oxobutyrate in 57.4% yield, B. P. 62° C. at 10 mm. This material was identified by hydrogenation to tetramethylene glycol (copper chromite catalyst, ca. 230° C., 700 atmospheres).

Example 10.—A mixture containing 75 cc. of diethyl ether, 20 grams of reduced, fused cobalt catalyst and 44 grams of butadiene was heated in a shaker tube for 2 hours at 142° to 220° C. under a pressure of 400 to 575 atmospheres of $CO:H_2$. Distillation of the resulting product under atmospheric pressure gave 11.4 grams of a fraction which boiled within the range of 101° to 121° C., having a Carbonyl No. of 449.

Example 11.—A mixture containing 100 cc. of water, 10 grams of reduced 65% cobalt-35% iron catalyst and 28 grams of ethylene was heated for 1.5 hours at 110° to 178° C. under a $CO:2H_2$ pressure of 550 to 730 atmospheres in a stainless steel shaker tube. Distillation of the product gave 13.3 grams of propionaldehyde (B. P., 49° C.) and 15 grams of alpha-methyl-beta-ethylacrolein (B. P. water azeotrope, 94° C.; B. P., after separation from water, 135° to 139° C.).

Example 12.—The following table records a series of experiments which show the reaction of various olefinic compounds with carbon monoxide and hydrogen in shaker tubes under the conditions stated (reaction time 0.5 to 2.0 hours).

| Olefinic Compound | Catalyst | Ratio $CO:H_2$ | Temperature, °C. | Pressure, atmospheres | Product | Approximate Yield, per cent |
|---|---|---|---|---|---|---|
| Allyl Cyanide | Cobalt (cyclohexane=diluent). | 1:1 | 130 | 630–750 | $NC(CH_2)_3CHO$ | 36 |
| Methyl $\Delta^3$-tetrahydrobenzoate. | ----do---- | 1:1 | 165–185 | 600–750 | Methyl formyl hexahydro benzoate (B. P. 73°–78° C. 3 mm.). | 70 |
| Furan | ----do---- | 1:2 | 100–205 | 555–740 | Mixture of aldehydes and alcohols (tetrahydro furfuryl alcohol identified). | |
| Tetramethyl-ethylene | ----do---- | 1:2 | 130–140 | 600–775 | Mixture containing high boiling aldehyde and alcohols. | |
| Allyl acetate | Cobalt (methyl formate=diluent). | 1:2 | 140–148 | 750–775 | $CH_3CO_2(CH_2)_4OH$ (B. P., 80° 2 mm.) | 39 |
| Methyl oleate | ----do---- | 1:2 | 140–145 | 600–750 | Mixed aldehyde esters | 72 |
| Vinyl cyclohexene | ----do---- | 1:2 | 120–134 | 475–720 | Mixed mono- and di-aldehydes | 65 |

*Example 13.*—A mixture containing 56.1 grams of butene-2, 100 cc. methyl formate, and 10 grams of reduced, fused alkali-free cobalt catalyst was heated in a silver-lined shaker tube for 2 hours at 120° to 175° C. under a $CO:2H_2$ pressure of 460 to 770 atmospheres. Distillation of the combined products of two such runs gave 110.3 grams of $(CH_3)(C_2H_5)CHCHO$ (B. P. 54° C. at 200 mm.), which corresponds to a conversion of 64%.

*Example 14.*—A mixture containing 75 cc. of diethyl ether, 28 grams of ethylene and 10 grams of a reduced, fused, alkali-free cobalt catalyst containing 3% copper was heated in a copper-lined shaker tube with a gas containing 2 volumes of hydrogen per volume of carbon monoxide under a pressure of 450 to 780 atmospheres at a temperature of 110° to 120° C. for 1.8 hours. The resulting product was withdrawn from the reaction vessel, and ether was removed therefrom by fractional distillation. A residue of propionaldehyde (B. P., 46° to 48° C.) and propionaldehyde trimer (B. P., 65° C. at 12.5 mm.; refractive index (25° C., D. line) = 1.4140) remained. The latter was depolymerized by distillation in the presence of a few drops of sulfuric acid. The total weight of propionaldehyde obtained was 42.8 grams which corresponds to a conversion of 73.8%.

*Example 15.*—A mixture having the composition $4H_2:CO:C_3H_6$ was passed over metallic cobalt catalyst (contact time, 0.8 min.) at 700 atmospheres pressure at a temperature of 170° C. Distillation of the liquid product showed that 65% of the propylene had reacted, forming a product which was chiefly a mixture of normal and isobutyraldehydes. The relative amounts of n-butyraldehyde and isobutyraldehyde were 75% and 25% respectively. Repetition of the experiment with $H_2:2CO:C_3H_6$ at 500 atmospheres pressure also gave a fraction containing butyraldehydes. The relative amounts of n-butyraldehyde and isobutyraldehyde in this fraction were 56% and 44% respectively.

While, in the foregoing examples, the invention is illustrated as a method for the preparation of saturated and unsaturated aldehydes, it will be understood that the method can be adapted to the manufacture of other organic compounds derivable therefrom. For example, condensation products of such aldehydes as are produced from the unsaturated compound, carbon monoxide, and hydrogen may be converted to cyclic trimers or high-boiling products under the reaction conditions. Also, if the hydrogenation is prolonged, it is possible to convert the aldehydes to the corresponding alcohols. Alternatively, the aldehydes may be hydrogenated to the corresponding alcohols in a separate step, in the absence of carbon monoxide. At temperatures above about 180° to 190° C., hydrogenation of carbon monoxide readily occurs and the alcohols produced either by CO hydrogenation, or by aldehyde hydrogenation, may react with aldehydes simultaneously formed, so that the resultant product may contain acetals.

The invention may be practiced by heating the reactants in any suitable pressure-resistant vessel such as an autoclave or tubular converter preferably made of or lined with inert materials such as glass, porcelain, inert metals and the like. If desired, materials of construction yielding small amounts of metallic carbonyls which are effective as catalyst may be employed. Outstanding results, however, are obtained in reaction vessels lined with silver or copper. In the continuous process, the reactants may be introduced at one or more points within the reaction vessel if desired. In certain instances, it is preferred to employ a tubular reaction vessel in which the temperature and pressure are not uniform throughout the length of the vessel.

Generally, mixtures containing carbon monoxide and hydrogen in the proportions of about 1:2 to 1:4 are preferably employed in the practice of the invention, but other mixtures of carbon monoxide and hydrogen, containing inert gases in certain instances, may be utilized if desired. The use of an excess of one of the reactants or of an inert diluent gas assists in dissipating the heat of the reaction.

The products obtained in accordance with this invention are widely useful, and are especially valuable as intermediates for the manufacture of alcohols, glycols, esters, and numerous other materials.

Since many embodiments of the invention may be made without departing from the spirit and scope, it will be understood that we do not limit ourselves except as set forth in the following claims.

We claim:

1. A process for preparing aldehydes which comprises heating an alkyl-substituted ethylene having from 3 to 6 carbon atoms per molecule with carbon monoxide and hydrogen, the initial molal ratio of $CO:H_2$ being from about 1:1.5 to about 1:10, at a temperature within the range of 75° to 250° C. under a pressure of 325 to 1500 atmospheres in the presence of a hydrogenation catalyst whereby a product containing an aldehyde is produced.

2. A process for preparing aldehydes which comprises heating an alkyl-substituted ethylene having from 3 to 6 carbon atoms per molecule with carbon monoxide and hydrogen, the initial molal ratio of $CO:H_2$ being from about 1:1.5 to about 1:10, at a temperature within the range of 100° to 200° C. under a pressure of 325 to 1500 atmospheres in the presence of a cobalt-containing hydrogenation catalyst whereby a product containing an aldehyde is produced.

3. A process for preparing propionaldehyde which comprises conducting ethylene continuously through a tubular reaction vessel with carbon monoxide and hydrogen, in the molal ratio of about 1:1:2 to about 1:1:4, at a temperature within the range of 100° to 200° C. under a pressure of 325 to 1500 atmospheres in the presence of a cobalt-containing hydrogenation catalyst whereby propionaldehyde is produced in 70% to 100% yield.

4. A process for preparing propionaldehyde which comprises reacting ethylene with carbon monoxide in substantially equimolal quantities and with hydrogen at a temperature within the range of 100° to 200° C. under a pressure of 325 to 1500 atmospheres in the presence of a hydrogenation catalyst, the molal ratio of carbon monoxide:hydrogen being initially from 1:2 to 1:4, whereby propionaldehyde is produced in at least about 90% yield.

5. A process for preparing aldehydes which comprises reacting an olefinic hydrocarbon having from two to eight carbon atoms per molecule, said hydrocarbon containing non-benzenoid olefinic unsaturation, with carbon monoxide and hydrogen, the initial molal ratio of $CO:H_2$ being about 1:1.5 to 1:10, at a temperature within the range of 75° to 250° C. and at a pressure within the range of 325 to 3000 atmospheres, in the presence of a hydrogenation catalyst containing cobalt, and thereafter separating from the resulting reaction product the aldehyde formed by the ensuing reaction.

6. A process for preparing aldehydes which comprises reacting an olefinic hydrocarbon having from two to eight carbon atoms per molecule, said hydrocarbon containing non-benzenoid olefinic unsaturation, with carbon monoxide and hydrogen, the initial molal ratio of olefin:$H_2$ being about 1:1, the initial molal ratio of CO:$H_2$ being about 1:2 to about 1:4, at a temperature within the range of 75° to 250° C. and at a pressure within the range of 325 to 3000 atmospheres in the presence of a hydrogenation catalyst containing cobalt, and thereafter separating from the resulting reaction product the aldehyde produced by the ensuing reaction.

7. The process of claim 6 in which the said reaction is conducted in the presence of an inert solvent medium.

8. The process of claim 6 in which the said reaction is conducted in the presence of xylene as an inert solvent medium.

9. The process of claim 6 in which the said olefinic hydrocarbon is ethylene.

10. The process of claim 6 in which the said olefinic hydrocarbon is an alkyl substituted ethylene having from 3 to 6 carbon atoms per molecule.

11. A process for preparing aldehydes which comprises reacting an olefinic hydrocarbon having from two to eight carbon atoms per molecule, said hydrocarbon containing non-benzenoid olefinic unsaturation, with carbon monoxide and hydrogen, the initial molal ratio of CO:$H_2$ being about 1:1.5 to 1:10, at a temperature within the range of 75° to 250° C. and at a pressure within the range of 325 to 3000 atmospheres, in the presence of a hydrogenation catalyst and thereafter separating from the resulting reaction product the aldehyde formed by the ensuing reaction.

WILLIAM F. GRESHAM.
RICHARD E. BROOKS.
WALTER M. BRUNER.

REFERENCES CITED

The following references are of record in the file of this patent:

UNITED STATES PATENTS

| Number | Name | Date |
|---|---|---|
| 2,327,066 | Roelen | Aug. 17, 1943 |

FOREIGN PATENTS

| Number | Country | Date |
|---|---|---|
| 119,979 | Switzerland | May 16, 1927 |
| 255,828 | Great Britain | May 27, 1926 |
| 660,678 | France | July 16, 1929 |

OTHER REFERENCES

Sugasawa, J. Pharm. Soc. Japan (1926), 65; C. 1927 I, page 1463.